US006980647B1

United States Patent
Daugherty et al.

(10) Patent No.: US 6,980,647 B1
(45) Date of Patent: Dec. 27, 2005

(54) PRIMARY TELEPHONE LINE PROTECTOR WITH FAILSAFE

(75) Inventors: Darren J. Daugherty, Irving, TX (US); Dennis M. McCoy, deceased, late of Dallas, TX (US); by Carol G. McCoy, Dallas, TX (US); Monty F. Webb, Richardson, TX (US); Paul A. Langer, Ft. Worth, TX (US); Kurt A. Wattelet, Flower Mound, TX (US)

(73) Assignee: Teccor Electronics, LP, Irving, TX (US)

( * ) Notice: Subject to any disclaimer, the term of this patent is extended or adjusted under 35 U.S.C. 154(b) by 0 days.

(21) Appl. No.: 09/481,460

(22) Filed: Jan. 11, 2000

Related U.S. Application Data

(60) Provisional application No. 60/115,599, filed on Jan. 12, 1999.

(51) Int. Cl.[7] ............... H04M 1/00; H04M 9/00; H04M 9/08
(52) U.S. Cl. ............ 379/412; 361/111; 361/119; 361/124; 361/125
(58) Field of Search ................ 379/412, 413, 379/413.02, 399.01, 401, 403, 404, 405; 361/58, 111, 117–119, 124–126

(56) References Cited

U.S. PATENT DOCUMENTS

| | | | |
|---|---|---|---|
| 3,886,408 A | * | 5/1975 | Klayum et al. ............ 361/56 |
| 3,889,221 A | | 6/1975 | Heisinger |
| 4,796,150 A | | 1/1989 | Dickey et al. |
| 4,876,621 A | | 10/1989 | Rust et al. |
| 4,901,188 A | | 2/1990 | Gilberts |
| 4,905,119 A | | 2/1990 | Webb |
| 4,907,120 A | | 3/1990 | Kaczmarek et al. |
| 4,944,003 A | | 7/1990 | Meyerhoefer et al. |
| 4,958,253 A | | 9/1990 | Gilberts et al. |
| 4,958,254 A | | 9/1990 | Kidd et al. |
| 4,964,160 A | | 10/1990 | Traube et al. |
| 5,101,317 A | | 3/1992 | Cwirzen et al. |
| 5,155,649 A | | 10/1992 | Hung et al. |
| 5,166,855 A | | 11/1992 | Turner |
| 5,175,662 A | | 12/1992 | DeBalko et al. |
| 5,191,605 A | | 3/1993 | Brower |
| 5,224,012 A | | 6/1993 | Smith |
| 5,231,367 A | | 7/1993 | Ikeda et al. |
| 5,276,422 A | | 1/1994 | Ikeda et al. |
| 5,327,318 A | | 7/1994 | Popat |
| 5,334,553 A | | 8/1994 | Popat |
| 5,341,270 A | | 8/1994 | Kaczmarek |
| 5,357,568 A | | 10/1994 | Pelegris |
| 5,359,657 A | | 10/1994 | Pelegris |
| 5,371,647 A | | 12/1994 | Fried et al. |
| 5,398,152 A | | 3/1995 | Borkowicz et al. |
| 5,422,779 A | | 6/1995 | Borkowicz et al. |
| 5,438,619 A | | 8/1995 | Shannon et al. |
| 5,488,535 A | | 1/1996 | Masghati |
| 5,523,916 A | | 6/1996 | Kaczmarek |
| 5,643,014 A | | 7/1997 | Filus et al. |
| 6,034,862 A | | 3/2000 | Pelosi |

\* cited by examiner

*Primary Examiner*—Duc Nguyen
(74) *Attorney, Agent, or Firm*—Chauza & Handley, LLP; Roger N. Chauza

(57) ABSTRACT

Disclosed is a module (10) having pins (16–24) connected to respective conductor tower strips (46, 48, 50, 52). Pairs (46, 50 and 48, 52) of the conductor tower strips are spring biased toward each other to capture therebetween respective PTC current limiting elements (64, 70). A spring member 60 is connected to a ground pin (24) at one end, and to an overvoltage sensitive assembly at the other end, via a soldered heat transfer member (92). The overvoltage sensitive assembly includes overvoltage semiconductor devices (76, 77, 79) soldered thereto. When an overvoltage condition is sensed, the heat generated by the devices melts the solder between the heat transfer member (92) and the spring member (60), whereby lateral arms (90) of the spring member (60) move and engage the conductor tower strips (50, 52). The tip and ring pins (16, 18) of the module (10) are not only shorted together, but are shorted to ground.

24 Claims, 6 Drawing Sheets

FRONT VIEW          BACK VIEW

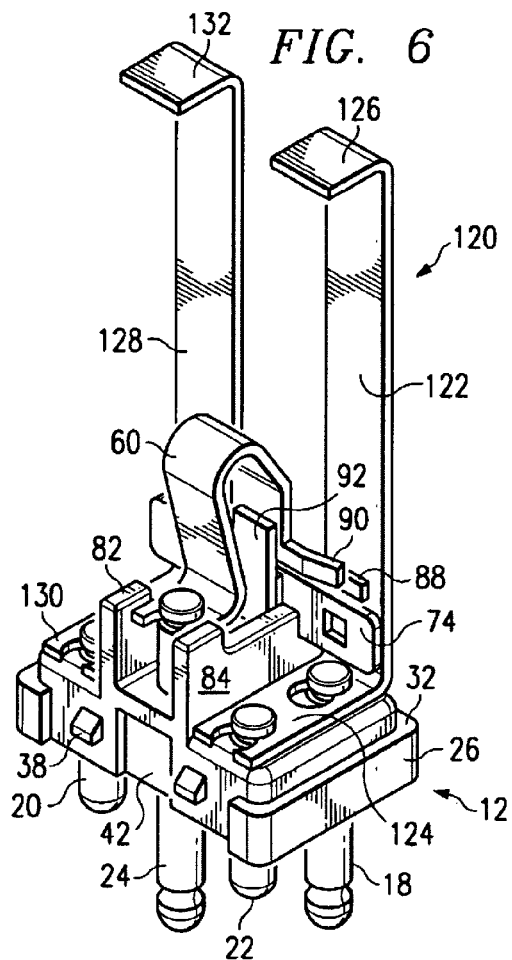

PRIMARY TELEPHONE LINE PROTECTOR WITH FAILSAFE

RELATED APPLICATION

This application claims priority to provisional patent application accorded application No. 60/115,599, filed Jan. 12, 1999.

TECHNICAL FIELD OF THE INVENTION

The present invention relates in general to protection circuits and devices for telephone lines, and the like, and more particularly to 5-pin telephone line protection devices.

BACKGROUND OF THE INVENTION

Telephone line protection devices have been required for many years by telephone operating companies, and the like, in order to provide protection to central office switching equipment from electrical strikes and power line voltages coupled to the telephone lines. At least one telephone line protector is required for each telephone subscriber line. In view that many central office switching systems service thousands, and often hundreds of thousands of subscribers, many such protection modules are required. Each module is constructed of a standardized size and with five pins of a uniform configuration. Two pins are associated with the tip and ring telephone lines, two other pins are associated with the customer or equipment tip and ring lines, and a fifth pin is connected to ground.

The basic function of a telephone line surge protection circuit is to sense an excessive voltage, such as 300 volts, on either the telephone line tip or ring conductor, and very quickly connect such conductor to ground to prevent the customer equipment from experiencing sustained voltages higher than such threshold. Specialized solid state devices are generally utilized for providing a high speed short circuit to ground. A host of other subsidiary features can be carried out by the protection device, including fail-safe grounding in response to a thermal overload, open circuiting in response to overcurrent conditions between the telephone line and customer lines, etc.

Because of the high demand for protection devices, a myriad of such devices are currently available. Illustrative of the many different protection device designs and modules are those set forth in U.S. Pat. No. 4,796,150 by Dickey et al.; U.S. Pat. No. 5,031,067 by Kidd et al; U.S. Pat. No. 5,172,296 by Kaczmarek; and U.S. Pat. No. 5,357,568 by Pelegris. In all of these protection module designs, there are many complicated parts which are necessary to carry out the line protection functions.

In many of the conventional telephone line protection modules, encapsulated semiconductor devices are utilized as overvoltage sensors and switches. The reason for this is that such devices are generally available from the manufacturer only in packaged or encapsulated form. Again, the additional processing of the devices to package the same results in a more expensive component, often when packaged devices are not necessary. For example, when a semiconductor device is packaged so as to have pins, then often a corresponding socket is required. It can be appreciated that the use of packaged components often leads to a more expensive product.

In many of the telephone line protection devices, including those identified in U.S. Pat. Nos. 5,101,317, 5,341,270 and 5,359,657, primary overvoltage protection is provided by fast-acting solid state devices, many of which are obtainable from Teccor Electronics, LP of Irving, Tex. These solid state devices are often referred to as "SIDACtor® devices", and are described more fully in U.S. Pat. No. 5,479,031 which is assigned to Teccor Electronics, LP. Secondary or fail-safe protection is often provided by other mechanical apparatus that is part of the telephone line protection module. U.S. Pat. Nos. 5,175,662, 5,357,568 and 3,359,657 disclose telephone line protection modules employing fail-safe mechanisms. The fail-safe apparatus is responsive to the thermal energy generated as a result of a sustained overvoltage condition imposed on the telephone line conductor (s). This apparatus generally involves a material having a low-temperature melting point, such as a tin-lead solder which, when subjected to a temperature that causes melting thereof, enables a spring to move and short circuit the tip and ring line conductors to the ground terminal of the module. The melting point of the solder compounds generally used may be as low as 150° F. Low-temperature melting solders are desirable because they trigger the fail-safe mechanism before extremely large sustained currents destroy other parts or components connected to the telephone line. However, low-temperature solders can in some instances melt due to elevated temperatures in indoor or outdoor cabinets and enclosures, in absence of any overvoltage on the telephone line conductors. This inadvertent activation is obviously undesirable.

The basic primary overvoltage protection and the fail-safe mechanism can be fabricated in a host of different variations, many of which are extremely complicated and thus expensive. Aside from the cost considerations of a mechanically complex device, the reliability is a function of numerous mechanical and electrical components. It can be appreciated that as the number of components increase and the component complexity increases, the assembly time and cost also increase.

From the foregoing, it can be seen that it would be advantageous to provide a new type of protection module that has few components, is easily assembled and is much less costly than the prior art modules. It would be advantageous to have an improved telephone line protection module that employs a semiconductor device assembly that is easily replaceable. Another need exists for a protection module design utilizing conductor tower strips of different shapes to achieve various functions, such as test points, eliminating series line current protection, and the connection therebetween of various circuit components. Another need exists for a protection module that incorporates a simplified failsafe mechanism.

SUMMARY OF THE INVENTION

In accordance with the invention, a primary telephone line protection device is disclosed which substantially reduces or eliminates the shortcomings and disadvantages associated with the corresponding prior art devices.

In accordance with an embodiment of the invention, there is disclosed a 5-pin telephone line protection device having conductor tower strips electrically connected to the telephone line tip and ring circuits and the customer side tip and ring pins. A pair of positive temperature coefficient (PTC) elements are held in compression between the conductive tower strips so as to provide a heat-sensitive resistance in series with the respective tip and ring circuits. A fail-safe mechanism operates in association with overvoltage sensitive devices to not only protect the telephone tip and ring lines from overvoltages, but also to short circuit the tip and ring lines together, and to ground, when a sustained overvoltage occurs. The overvoltage sensitive devices constitute SIDACtor® devices which provide high speed overvoltage protection to the telephone lines. The SIDACtor® devices are fabricated as silicon chips with front and back side contact surfaces. The overvoltage sensitive devices are soldered to a copper member which is positioned between a spring-loaded member and the tip and ring conductive tower strips. In a non-activated state, the spring member is maintained in a compressed state, spaced from the tip and ring conductive tower strips, but pressed against one overvoltage sensitive device by way of a metal heat transfer member soldered to the spring member.

The fail-safe mechanism is operated when either overvoltage sensitive device experiences an overvoltage to the extent that sufficient thermal heat is generated to melt the solder that bonds the heat transfer member to the spring member. When this happens, the spring-member is released so that it springs outwardly and short circuits the tip and ring conductor tower strips together, as well as to ground.

Various features can be added to the telephone line protection module. For example, the tip and ring conductor tower strips can be bent at an angle at the top thereof so as to provide test points that are accessible through holes formed in the top of a protective cover. Moreover, the PTC elements can be eliminated, and substituted by a short circuit, by forming a bottom portion of the tip and ring conductor tower strips so as to be electrically connected to the customer side and telephone side tip pins, and connected to the telephone side and customer side ring pins. According to yet another feature of the invention, the customer side conductor tower strips can be crisscrossed to thereby provide a reversal of the tip and ring circuits. Half ringer circuits, as well as other circuits can be connected between the tip and ring conductor tower strips.

In one embodiment of the invention, there is disclosed a telephone line protection module that provides overvoltage and failsafe protection. The module comprises a tip conductor, a ring conductor, a ground conductor, a spring member adapted for movement into contact with one said tip or ring conductor, and a conductive member biased by the spring member toward the tip and ring conductors. The module further includes an overvoltage sensitive device positioned between the conductive member and one of either the tip conductor or the ring conductor, such that the overvoltage sensitive device is in electrical contact with the conductive member and the tip conductor or ring conductor.

In another embodiment, there is disclosed a telephone line protection module that provides line overvoltage and failsafe protection, where such module comprises a module base supporting at least a ground conductor, a tip conductor and a ring conductor. The module further includes a conductive spring member electrically connected to the ground pin of the module, the spring member has a width adapted for engaging the tip and ring conductors to short circuit the tip and ring conductors together and to ground. Further included is a heat transfer member bonded to the spring member with a heat sensitive material so as to become unbonded from said spring member in response to thermal energy transferred to the heat sensitive material via said heat transfer member. A conductive member is included to which two or more overvoltage sensitive devices are mounted, the conductive member being urged against said tip and ring conductors by the heat transfer member. Lastly, the module maintains the spring member in a first position where the width thereof is not in electrical contact with the tip and ring pins when the heat transfer member remains bonded to the spring member. The spring member is biased to move to a second position when thermal energy generated by the overvoltage sensitive devices causes the heat transfer member to become unbonded from the spring member, thereby allowing a portion of the spring member to move and engage the tip and ring conductors.

In yet another embodiment, there is disclosed a telephone line protection module that includes a plurality of pins, a first and second of which are associated with customer side circuits, and a third and fourth pin which are associated with telephone line circuits. Further included is a fifth pin associated with ground. A base of the module supports the pins in a predefined configuration. The module includes a first and second elongate conductor strip, each fixed to a respective pin associated with the customer side equipment, a third and fourth elongate conductor strip, each associated with telephone line circuits, a conductive member to which three overvoltage sensitive semiconductor devices are mounted, a first and second semiconductor device engageable respectively with the third and fourth elongate conductor strips, a conductive spring member connected to the fifth pin, the conductive spring member having a pair of arms for short circuiting together the third and fourth elongate conductor strips when the conductive spring member moves toward a relaxed position, and a heat conductive member soldered to the conductive spring member in a position such that the heat conductive member is spring biased against the third semiconductor device, whereby when the third semiconductor device generates sufficient thermal energy to melt the solder, a portion of the conductive spring member moves so as to cause the short circuiting of the third and fourth elongate conductor strips with the pair of arms.

BRIEF DESCRIPTION OF THE DRAWINGS

Further features and advantages will become apparent from the following and more particular description of the preferred and other embodiments of the invention, as illustrated in the accompanying drawings in which like reference characters generally refer to same parts, elements or members throughout the views, and in which:

FIG. 5b depicts front and back views of a printed circuit board utilized in the embodiment of FIG. 5a;

FIG. 6 is a view of yet another embodiment of the invention utilizing only the overvoltage and failsafe mechanism, and no overcurrent protection;

FIG. 7 is another embodiment similar to that shown in FIG. 6, but without the utilization of the vertically-oriented test point tabs at the top of the conductor tower strips;

FIG. 8 is another embodiment of the invention, similar to that shown in FIG. 6, but utilizing a half ringer circuit coupled between the test point tabs of the tip and ring lines;

DETAILED DESCRIPTION OF THE INVENTION

Figure 1:
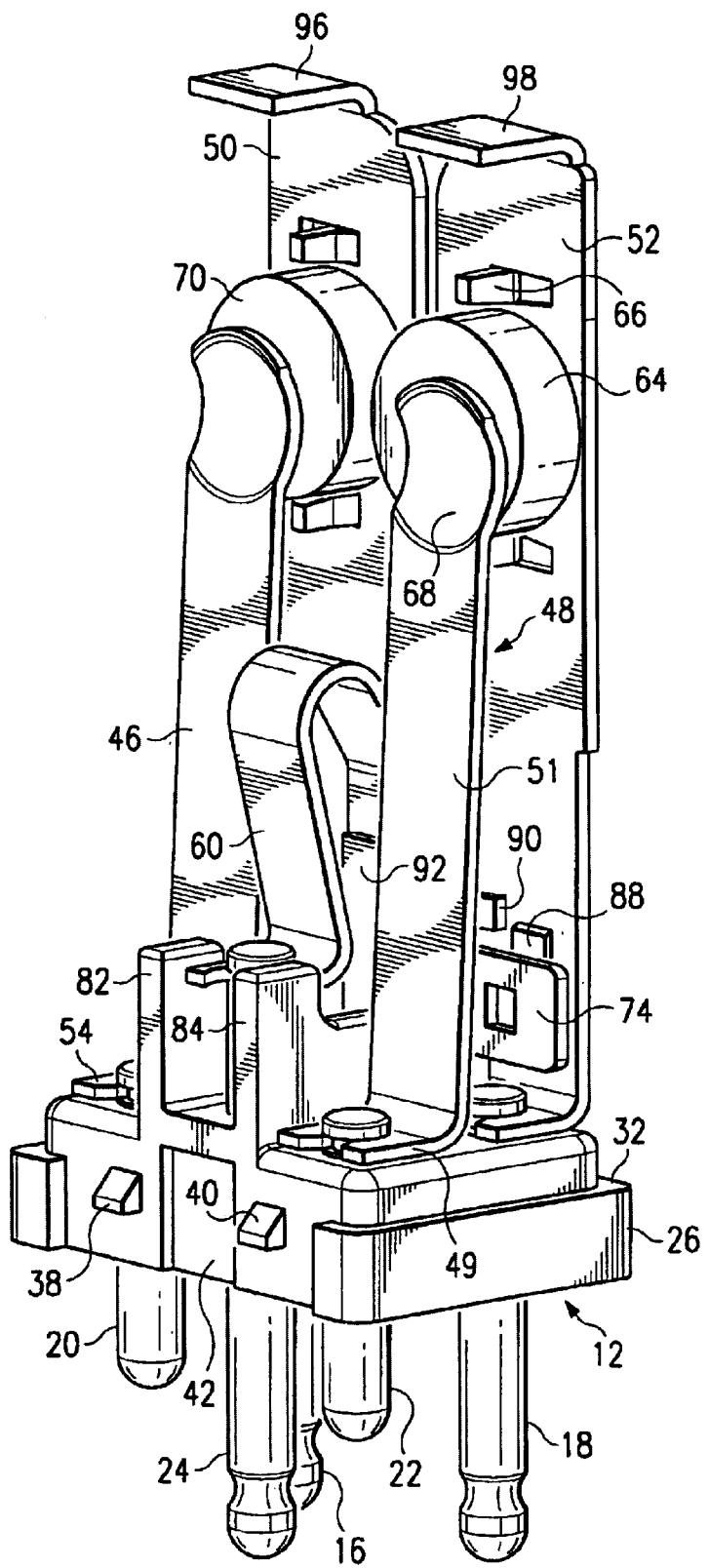
FIG. 1 is an isometric view of the telephone line protection module constructed according to one embodiment of the invention and this embodiment is shown without a protective cover, and employs overvoltage, overcurrent and failsafe protection.

FIG. 1 illustrates the detailed construction of the telephone line protection module constructed according to the preferred embodiment of the invention. The module 10 employs an overcurrent protection circuit in series with the telephone line tip and ring conductors, as well as an overvoltage and failsafe protection assembly.

Referring now to FIGS. 1–4, a telephone line protection module 10 is shown with a plastic molded base 12 having contact pins protruding therefrom. The pins are situated in a standard configuration as recognized by those skilled in the art. Conventionally available five-pin sockets can be utilized to provide electrical connections to the telephone line tip and ring conductors, the customer equipment tip and ring conductors, and to a ground or circuit common potential. Two long pins of the molded base 12 include a telephone line tip pin 16 and a telephone line ring pin 18. Two short pins include a customer equipment tip pin 20 and a customer equipment ring pin 22. Lastly, a long ground pin 24 is provided. The pins are press fit or otherwise suitably retained in corresponding holes 25 formed in the plastic base 12.

The plastic base 12 is formed with an annular rib or shoulder 26 around the bottom edge thereof A protective cover 28 is formed with a bottom edge 30 that abuts against a corresponding edge 32 of the annular shoulder 26 of the base 12. The cover 28 includes a pair of opposing downwardly depending tabs 34, each having formed therein a pair of rectangular-shaped holes 36 into which a button 38 formed on the base 12 engages. Each button 38 includes a tapered or chamfered edge 40 to allow the downwardly depending tabs 34 to deform outwardly when the cover 28 is pushed and snap fit onto the plastic base 12. A pair of opposing slots 42 is formed in the base 12 to allow a small screwdriver blade, or the like, to be inserted between the tab 34 of the cover 28 and the base 12 to disengage the buttons 38 from the holes 36 of the cover 28. In this manner, the cover 28 can be easily removed.

Each module pin 16–22 includes an annular groove 44 (such as shown with ground pin 24) formed around a top end thereof When fully inserted into a respective hole 25 of molded base 12, the annular groove 44 of each pin is positioned above the top surface of the plastic base 12. Engaged with each annular groove 44 of each pin is a corresponding slotted metallic conductor tower strip. The conductor tower strips associated with customer equipment pins 20 and 22 are formed with an angle a therein so as to define a lateral part 49 and a vertical tower 51. The customer equipment side module pins 20 and 22 are connected to respective metallic conductor tower strips 46 and 48. The long telephone line pins 16 and 18 are connected to respective conductor tower strips 50 and 52, which are longer than the customer side tower strips 46 and 48. Each conductor tower strip 46, 48, 50 and 52 is fabricated with a conductive, spring-like material such as phosphor bronze. Each such tower strip is generally elongate, and includes a slotted connection tab formed integral therewith. One slotted connection tab 54 is shown with respect to conductor tower strip 46 in FIG. 2. Each connection tab 54 is slotted as shown to snap fit around the corresponding annular groove 44 of a pin. Different shapes and sizes of conductor tower strips can thus be selected and utilized during the module assembly procedure. The customer equipment side conductor tower strips 46 and 48 are each formed having an angle a greater than 90° so that the vertical part of the tower is disposed toward the respective telephone line side conductor tower strips 50 and 52. The two frontal conductor tower strips 46 and 48 are thus spring biased against the respective back tower strips 50 and 52. As will be described below, a PTC element is placed between the pairs of conductor tower strips that are spring biased together. Those skilled in the art may find that reliability is increased if the pins of the base 12 are also soldered to the respective slotted connection tabs 54. The assembly and reliability of the telephone line protection device 10 is facilitated with this arrangement.

Figure 9A:
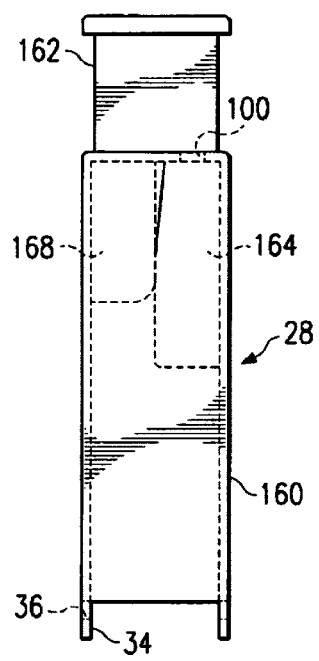
FIGS. 9a–9d illustrate various views of the features of the protective cover that is attachable to the telephone line protection device.
Figure 9B:
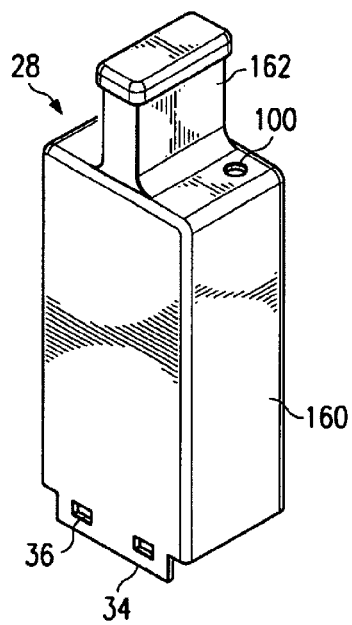
Figure 9D:
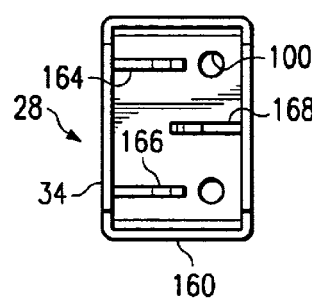
Figure 9C:
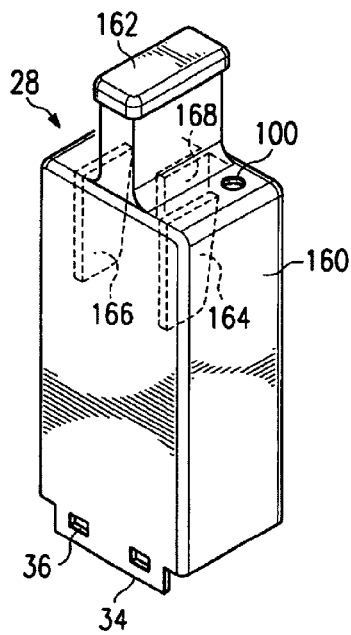

The telephone line ring pin 18 is electrically connected to the conductor tower strip 52 which, in turn, is electrically connected in series to the conductor tower strip 48, via a positive temperature coefficient (PTC) element 64. Upper and lower punchthrough tabs 66, 67 maintain the PTC element 64 vertically registered therebelow with respect to the conductor tower strip 52. The conductor tower strip 48 associated with the customer ring pin 22 has a domed or cupped area 68 which provides electrical contact with one surface of the PTC element 64. Thus, the PTC element 64 is vertically constrained by the punch-through tabs 66, 67 and is sandwiched between the spring biased conductive tower strips so that displacement thereof is prevented. The conductor tower strips 50 and 52 can be formed with domed areas therein to enhance the contact with the respective PTC elements 64 and 70. As will be discussed below, the protective cover 28, which includes an internal webbing structure (shown in FIGS. 9a, c and d), laterally constrains each PTC element 64 so as not to be dislodged if the module is jarred or dropped. The PTC element 70 is similarly constrained by the other pair of conductor tower strips 46 and 50 so as to provide a serial electrical path between the telephone line tip pin 16 and the customer side tip pin 20.

The positive temperature coefficient elements 64 and 70 are of conventional design for providing protection to the customer equipment, should an overcurrent condition exist either on the telephone line tip conductor or on the telephone line ring conductor. The PTC elements 64 and 70 operate in a conventional manner in response to overcurrent conditions. Namely, the PTC elements 64 and 70 increase in resistance in response to increased currents, thereby protecting customer side equipment from overcurrent conditions. When the overcurrent condition is removed, the PTC elements 64 and 70 "reset", meaning that the resistance thereof returns to a low resistance value, generally between 2–10 ohms. Should the PTC elements 64 and 70 become defective, they can be easily replaced by removal of the cover 28, removing the defective component and replacing it with a new PTC element.

A U-shaped spring member 60 is associated with an overvoltage failsafe mechanism, as described below. The overvoltage failsafe mechanism functions to ground the conductor tower strips 50 and 52 of the telephone line side in response to any sustained overvoltage condition on either the telephone line tip conductor or the telephone line ring conductor (not shown). Indeed, if either the telephone line tip or ring conductors experience a sustained overvoltage condition, both of the corresponding conductor tower strips 50 and 52 are shorted to ground via the spring member 60.

It should be noted that in the absence of any sustained overvoltage condition, the customer equipment is nevertheless protected from impulse overvoltage conditions on the lines by operation of the overvoltage sensitive devices described below. In this event, the failsafe mechanism will not operate.

Figure 10:
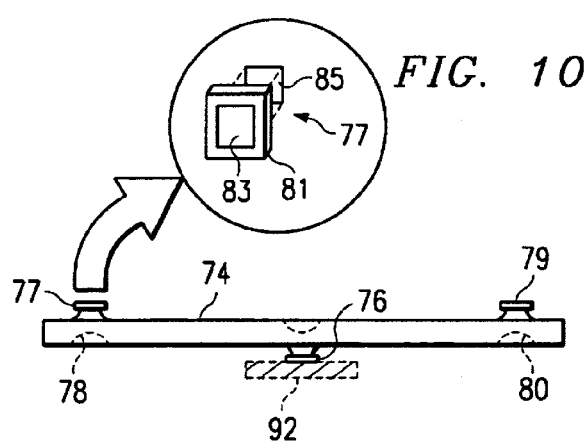
FIG. 10 is a top view of the overvoltage sensing assembly, with one semiconductor device shown in enlarged form.

A lateral slotted connection tab 62 of the spring member 60 is connected directly to the ground pin 24. As an additional part of the overvoltage failsafe mechanism, there is provided an assembly including a copper conductive member 74 to which two or three overvoltage sensitive devices are electrically connected. Referring now also to FIG. 10, the copper conductive member 74 has one front side semiconductor device 76 soldered to a pedestal, while two other semiconductor devices 77 and 79 are soldered to respective pedestals formed on the back side of the copper conductive member 74 at locations denoted by the pedestal intentions 78 and 80. This assembly is spring biased against the two conductor tower strips 50 and 52 so that the semiconductor overvoltage sensitive device 79 contacts the ring conductor tower strip 52, and the semiconductor overvoltage sensitive device 77 contacts the tip conductor tower strip 50. As will be described below, the third semiconductor overvoltage protection device 76, when utilized, is connected to a circuit ground through the spring member 60.

The overvoltage failsafe mechanism is supported, in part, by the plastic base 12. The plastic base 12 has formed integral therewith a pair of spaced apart, stepped isolators 82 and 84. The stepped isolators 82 and 84 function to prevent swiveling or rotation of the spring member 60 about the grooved portion of the ground pin 24. Moreover, the stepped separators 82 and 84 serve to loosely cradle the copper member 74 so that the back side overvoltage sensitive devices 77 and 79 are loosely situated adjacent to the conductor tower strips 50 and 52. The copper member 74 is laterally constrained against movement by the protective cover 28, and is vertically constrained by resting on the bottom step of the stepped isolators 82 and 84. The copper member is further constrained by raised areas 86 and 88 that are mechanically formed by partial punching in the backside of the conductor tower strips 50 and 52. It can be appreciated that in the absence of any overvoltage condition on either the telephone line tip or ring conductors, the three overvoltage sensitive devices 76, 77 and 79 are open-circuited and do not electrically affect the operation of the circuits connected thereto.

FIG. 10 illustrates in detail a balanced, Y-connected overvoltage sensitive assembly. As noted above, the devices 76, 77 and 79 are preferably SIDACtor® devices, obtainable from Teccor Electronics, LP., Irving, Tex., as part number 135FRB for device 76, and part number 105FRB for devices 77 and 79. These devices 76, 77 and 79 are bidirectional thyristors specially adapted for balanced telephone line protection. U.S. Pat. No. 4,905,119, the disclosure of which is incorporated herein by reference, sets forth the characteristics of each SIDACtor® device, and the Y-connection, to provide balanced protection to a telephone line. When connected in a "Y" configuration, if any one of the two back side devices 77 or 79 is activated in response to an overvoltage condition on the respective telephone line conductor, such device carries current therethrough as well as through the front side overvoltage sensitive device 76. Hence, the front side device 76 is triggered into conduction when either one or both of the two back side devices 77 and 79 is driven into conduction by an overvoltage condition. This is due to the different breakover voltage and holding current characteristics of the devices.

Preferably, although not by necessity, the overvoltage sensitive devices 76, 77 and 79 have not undergone a final packaging process, as is normally accomplished by the use of a plastic or ceramic encapsulation. Rather, the semiconductor overvoltage sensitive devices 76, 77 and 79 have only been passivated at the chip level and provided with front and back solderable contact surfaces. The passivation is accomplished by selectively depositing glass on the surfaces of the semiconductor chip during the final processing of the wafer. An enlarged view of one overvoltage sensitive device 77 is illustrated in the inset of FIG. 10. The silicon chip 81 is about 105 mils (2.7 mm) square and 10 mils (0.25 mm) thick. A semiconductor chip of this size is utilized for overvoltage sensitive devices 77 and 79. When used for overvoltage sensitive device 76, the chip is larger (135 mils (3.4 mm) square) so that the surge current capability is increased. It is noted that when connected in the Y configuration, the device 76 must be capable of carrying the combined current that can flow through both of the other devices 77 and 79. The chip 81 has formed on one side thereof a solderable nickel contact surface 83 as a result of the semiconductor processing steps. On the opposite side, a 10 mil (0.25 mm) thick copper sheet 85 is soldered to a corresponding contact of the silicon chip 81. The copper sheet 85 reduces chip stress and point contact loading thereon when pressed by the U-shape spring member 60 against the respective conductor tower strips 50 and 52.

After passivating the wafer, the chips are cut from the wafer so as to be individualized. The cut chips can then be installed in the module without resorting to the conventional encapsulation process. Indeed, the edges of the semiconductor chips of devices 77, 79 and 80 can not only be seen with the naked eye, but are also physically accessible. It is noted that standard encapsulation processes provide mechanical protection to the chip, as well as a mechanism to physically handle the small chips. It has been found that when the chips are fabricated at the same manufacturing location, or by the same business where the modules are assembled, the extra cost and equipment involved in encapsulation is not necessary. With this arrangement, the cost of such devices is substantially minimized, thus lowering the cost of the overall module.

As noted above, the spring member 60 is anchored at one end thereof by the slotted connection tab 62 to the ground pin 24. The other end of the spring member 60 is formed with a pair of outwardly extending arms, one shown as reference numeral 90. Each lateral arm 90 is slightly bent, as illustrated, toward the respective conductor tower strips 50 and 52. Soldered to the spring member 60 between the lateral arms 90 is a metallic heat transfer member 92. The heat transfer member 92 is soldered to the spring member 60 by solder, which melts in a temperature range of about 180°–310° C. The melting temperature of the solder is selected, based on the length and quality of the thermal path between the heat transfer member 92 and the overvoltage sensitive device 76. This structure functions such that when a predetermined current flows through an overvoltage sensitive device 76 for a period of time, sufficient thermal energy is generated to the extent that the solder melts and the spring member 60 is released from the heat transfer member 92. During assembly, the spring member 60 is compressed so that the heat transfer member 92 is forced or otherwise urged against the thick copper contact 85 of the frontal overvoltage sensitive device 76 which, in turn, forces the copper member 74 towards the back of the module. Thus, the two back side semiconductor devices 77 and 79 are forced into electrical contact against the respective conductor tower strips 50 and 52. Again, if no overvoltage condition exists, all three overvoltage sensitive devices are open-circuited, and no current flows therethrough. During this normal condition, the lateral arms 90 of the spring member 60 are spaced away from the conductive tower strips 50 and 52, as noted in FIG. 3.

In operation of the failsafe mechanism, should an overvoltage condition exist on either the telephone line tip side or the telephone line ring side, the respective back side device 77 or 79 will exceed a breakover voltage and conduct current, as will the front side device 76. When the front side device 76 conducts current, thermal energy is generated and transferred both to the copper member 74 as well as to the soldered heat transfer member 92 in contact therewith. If sufficient heat is generated due to a sustained overvoltage condition, the solder that joins the heat transfer member 92 to the spring member 60 melts, thereby releasing the end of the spring member 60 and allowing the lateral arms 90 to move into contact with both the conductor tower strips 50 and 52. When the lateral arms 90 of the spring member 60 move in the manner noted, the conductor tower strips 50 and 52 are not only shorted together, but they are shorted to the ground pin 24 via the spring member 60. If the overvoltage condition is only for a short duration, the overvoltage sensitive devices will momentarily conduct to provide a temporary current path to ground. In this event, insufficient thermal energy is created in order for the melting point of the solder to be reached.

There exists yet another situation in which failsafe protection is provided to the telephone tip and ring lines. Relatively short duration high energy bursts can occur, such as lightning strikes to one or both lines. In this instance, the thermal energy transferred to the heat transfer member 92 may be insufficient to melt the soldered connection to the spring member 60. The thermal energy may, however, be sufficient to thermally or mechanically compromise or destroy the semiconductor chip 81 or other portions of the overvoltage sensitive devices 77 or 79. When the semiconductor material is damaged due to the local intense thermal energy, the conductive member 74 moves forwardly under spring tension into direct contact with the respective conductor tower strips 50 or 52, or into contact with the respective conductor tower strips 50 and 52 through the conductive residue of the damaged device(s).

The embodiment of the invention described above is assembled by soldering a respective surface contact 83 of the two overvoltage sensitive devices 77 and 79 to the copper conductive member 74. As an alternative, the overvoltage sensitive devices 77 and 79, can be soldered to the respective conductor tower strips 50 and 52. It is preferable that the overvoltage devices 77 and 79 are mounted by soldering only one of the surface contacts 83 or 85, and allowing the other surface contact to make only physical contact with the copper conductive member 74, or the respective conductor tower strip 50 or 52. If both surface contacts are soldered to position the respective overvoltage device, thermal stresses could have adverse affects on the chip 81. Moreover, by mounting the overvoltage devices 77 and 79 using only one soldered surface contact, the potential damage to the device due to shock and vibration is reduced. To that end, it is preferable to solder or otherwise conductively bond the overvoltage sensitive devices 77 and 79 to the copper member 74 so that any shock or G-force applied to a conductor tower strip is not fully transferred to the respective overvoltage device 77 or 79. Stated another way, if the telephone line protection module is inadvertently dropped so that the module pins are exposed to an impact, the respective pin and conductor tower strip may abruptly move in response thereto, but the semiconductor overvoltage sensitive devices 77 and/or 79 will not follow the impact movement because they are not rigidly fixed to the conductor tower strips 50 or 52. Rather, the surface contact(s) 83 of the device(s) will slide somewhat on the side of the conductor tower strip(s) 50 or 52, but will remain in contact therewith and be better able to survive the impact shock.

Other telephone line protection modules utilizing similar overvoltage protection devices are disclosed in U.S. application Ser. No. 09/036,436, filed Mar. 9, 1998 and entitled "Telephony Protection Element"; and U.S. application Ser. No. 09/036,559, filed Mar. 9, 1998 and entitled "Telephone Line Surge Protector", the disclosure of both applications being incorporated herein by reference thereto.

The above-described telephone line protective device 10 provides to the customer equipment overcurrent protection, overvoltage protection, and failsafe protection in response to both short and extended duration high energy pulses. Moreover, the protection module 10 includes relatively few components as compared to corresponding prior art devices, is easily assembled with a minimal number of components, thereby making the module reliable and low cost.

Figure 2:
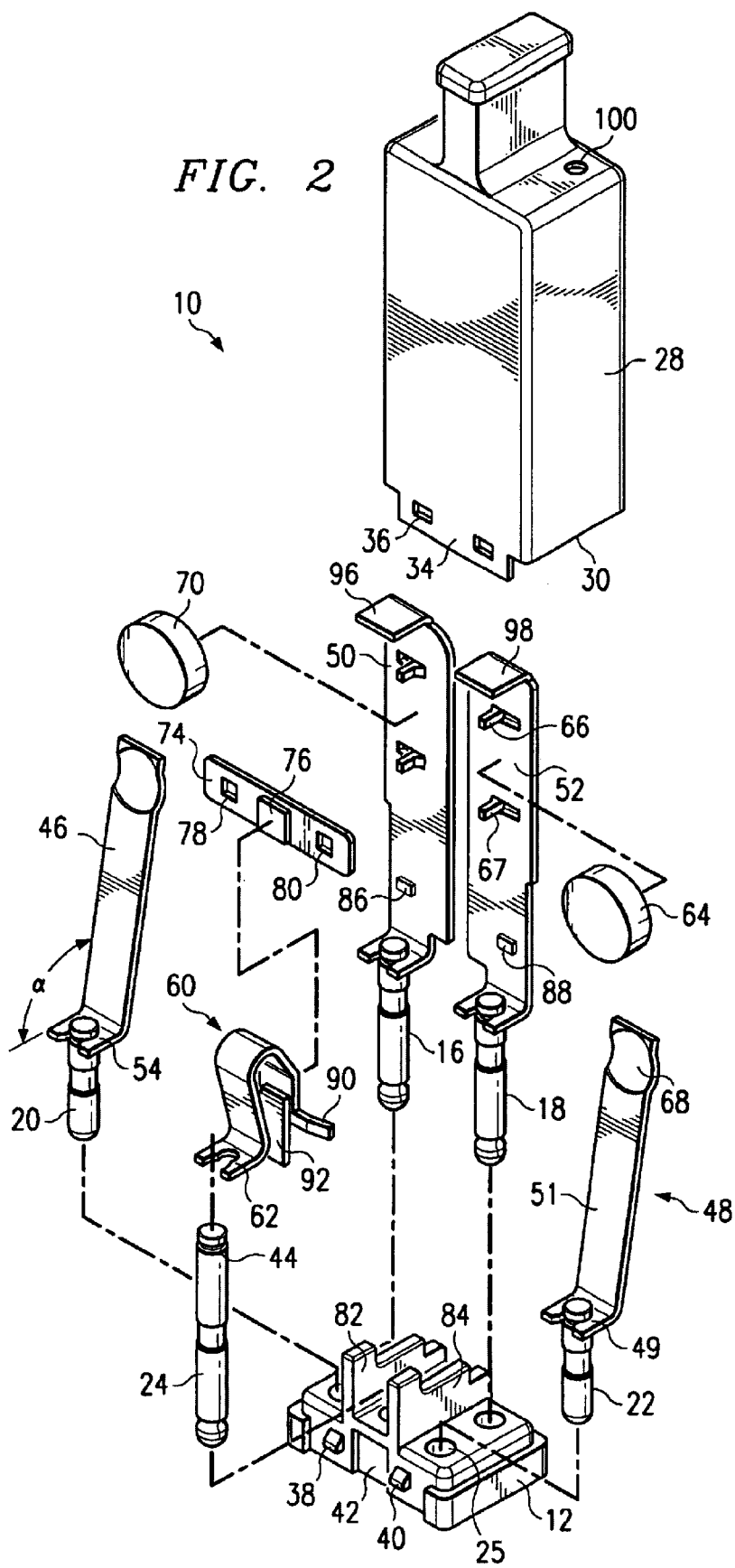
FIG. 2 is an exploded view of the components of the telephone line protection module of FIG. 1, shown with the protective cover removed upwardly therefrom.
Figure 3:
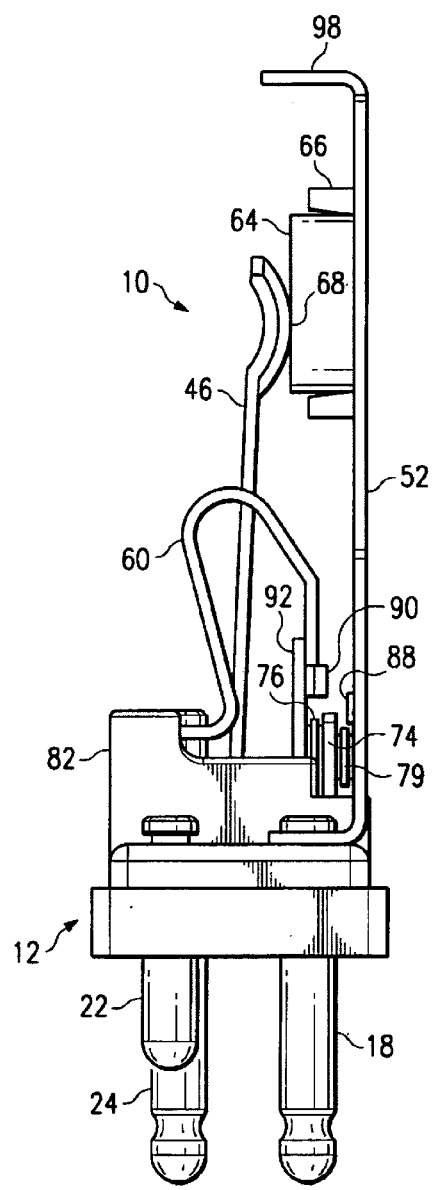
FIG. 3 is a right side view of the telephone line protection module of FIG. 1, with one conductor tower strip shown removed to illustrate the details of the failsafe mechanism.
Figure 4:
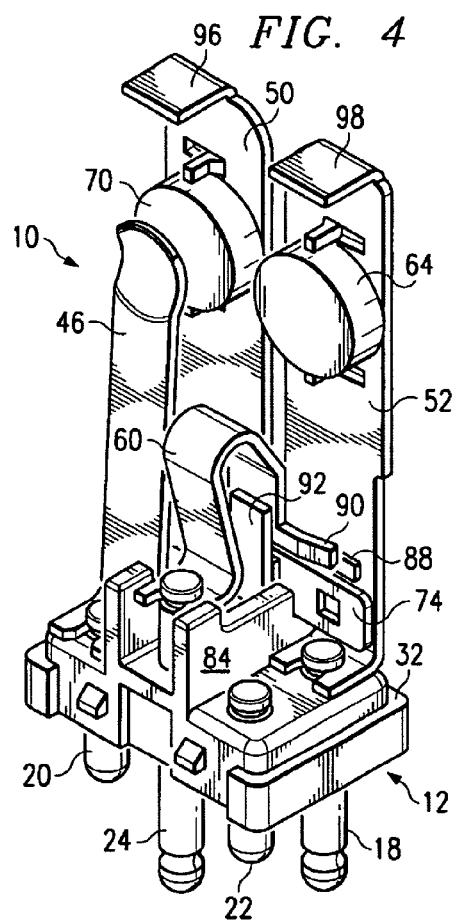
FIG. 4 is an isometric view of the module shown in FIG. 3.

The embodiment shown in FIGS. 1–4 includes conductor tower strips 50 and 52 which are constructed to provide test and monitor points for the tip and ring line circuits. The test points include laterally bent tabs 96 and 98 formed at the top portion of the conductor tower strips 50 and 52. The conductor tower strip 52 associated with the telephone line ring circuit is connected to the pin 18, which can plug into a socket that is electrically connected to the telephone line ring conductor. External access to the test point 98 is obtained via a hole 100 formed in the top of the protective cover 28 (FIG. 2). Test point 96 associated with the telephone line tip circuit is externally accessible through another hole (not shown) in the cover 28. A craftsperson can thus insert probes through the holes 100 in the cover 28 and monitor or otherwise test the telephone tip and ring circuits without either removing the protective cover 28, or incurring the possibility of short circuiting the test probes to other internal conductors or components.

Figure 5A:
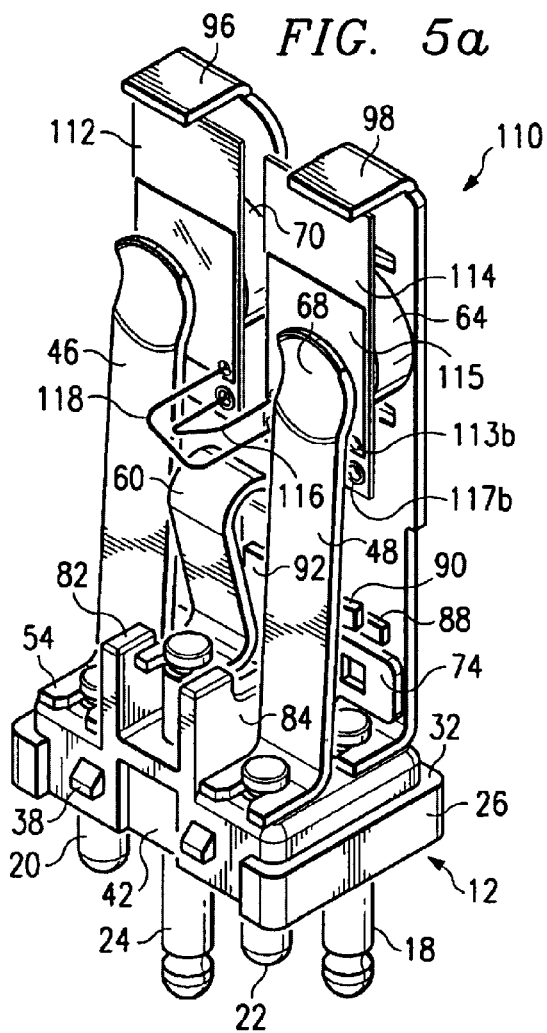
FIG. 5a illustrates another embodiment of the invention similar to that shown in FIG. 1, but adapted to provide reversal of the tip and ring line conductors.
Figure 5B:
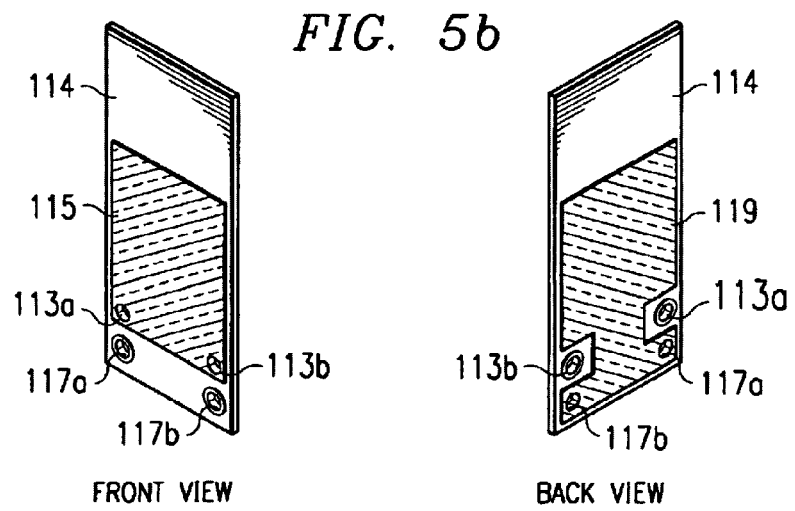

Referring now to FIGS. 5a and 5b, there is illustrated another embodiment of a telephone line protection module 110. Provisions are made in this embodiment for wiring or otherwise cross-connecting the four conductor tower strips to provide a reversal between the tip and ring conductors. The telephone line protection module 110 of this embodiment further includes a pair of printed circuit boards 112 and 114 disposed between the dome-tipped conductor strips 46 and 48 and the respective PTC elements 64 and 70. The printed circuit boards 112 and 114 are identically formed having plated conductive surfaces facing the domed contacts 68 of the conductor tower strips 46 and 48. The opposite face surfaces of the printed circuit boards 112 and 114 are also plated so as to be conductive and provide electrical contact to the respective PTC elements 64 and 70. Each printed circuit board has a pair of platedthrough holes for providing a hard-wired reversal of the telephone line tip and ring conductors. Printed circuit board 114 (FIG. 5b), for example, has a pair of laterally spaced, plated through holes 113a and 113b connected only to the frontal conductive surface 115. Another pair of plated through holes 117a and 117b make contact only to the back conductive surface 119 of the printed circuit board 114. In addition, the frontal conductive surface 115 of printed circuit board 114 is hard-wired with a wire conductor 116 to the plated through hole which is connected to the back side conductive surface 119. In this manner, the telephone line ring circuit is effectively connected to the customer side tip circuit. The back conductive side of the printed circuit board 112 is similarly connected with a wire 118 to the front side conductive surface of printed circuit board 114. The telephone line tip circuit is thus effectively wired to the customer side ring circuit. The PTC elements 64 are preferably soldered directly to the conductive backside surfaces of the printed circuit boards 112 and 114 so that the circuit boards remain positioned as shown. This prevents the printed circuit boards 112 and 114 from being jarred or otherwise displaced by handling or dropping of the protection module. It is noted that only a single type of printed circuit board need be utilized in association with the tip and ring circuits.

As an alternative to the tip and ring reversal circuit described above, those skilled in the art may prefer to dispense with the wires 116 and 118, as well as the circuit boards 112 and 114, and provide criss-crossed conductor tower strips 46 and 48. With this arrangement, a conductor tower strip connected to the customer side ring pin 22 would cross over and make direct contact to the PTC member associated with the telephone line tip circuit. In like manner, the conductor tower strip connected to the customer side tip pin 20 would cross over and make direct contact with the PTC element 64 associated with the telephone line ring pin 18. Those skilled in the art may devise yet other arrangements for providing a reversal between the telephone line at tip and ring circuits and the customer side tip and ring circuits.

FIG. 6 illustrates yet another embodiment 120 of the invention in which only overvoltage protection is provided. In this embodiment, there are no PTC elements in series with the tip and ring circuits. Rather, the telephone line ring pin 18 is short circuited directly to the customer side ring pin 22 by the lower, angled tab 124 of the conductor tower strip 122. The conductor tower strip 122 has an angled bottom leg 124 that is double slotted so that it can be connected to both telephone line and customer side ring pins 18 and 22. The conductor tower strip 122 is also provided with a test point tab 126 at the top thereof The overvoltage protection circuit is constructed in the same manner as shown and described in connection with FIGS. 1–4, and operates in substantially the same manner. A conductor tower strip 128 associated with the telephone line and customer side tip circuits is similarly constructed with a double slotted angled part 130 for short circuiting the set of tip pins of the telephone line protection module 120. In addition, a test point 132 is provided by bending at an angle a top portion of the conductor tower strip 128. In this manner, the test points 126 and 132 are disposed upwardly close to access holes 100 of the protection cover 28.

FIG. 7 illustrates another embodiment of a telephone line protection module 140. Here, the module is constructed substantially identical to that shown in FIG. 6, but without the test points. This telephone line protection module 140 includes a conductive strip 142 that is formed with a bottom angled end 143 with two slots so that the telephone line and subscriber circuit ring pins 18 and 22 are short-circuited. In other words, the lateral part 143 has two slotted openings for engaging the respective annular grooves 44 of the module pins 18 and 22. However, the conductive strip 142 only extends upwardly to the extent necessary to enable the lateral arms 90 of the spring member 60 to contact and short circuit the telephone line tip and ring circuits together. The conductive strip 144 associated with the telephone line tip and customer side tip circuits is similarly constructed.

With reference now to FIG. 8, there is illustrated another telephone line protection module 150. This module 150 is similar to that shown in FIG. 6, but with the provision of a half ringer circuit 152 electrically connected between the test point tabs 126 and 132 of the respective telephone line conductor tower strips 122 and 128. The half ringer circuit 152 itself is of conventional design, including a series combination of a capacitor, resistor and two back-to-back cathode connected diodes. The components of the half ringer circuit 152 are soldered to a printed circuit board 154. On the back side of the printed circuit board 154, there is formed a pair of conductive pads (not shown) that are soldered to the undersurfaces of the test point tabs 132 and 126. The half ringer 152 is thus electrically connected to tip and ring pins of the telephone line side of the circuits. It can be appreciated by those skilled in the art that other types of circuits can be connected to the telephone line tip and ring circuits by connection between the conductor tower strips 122 and 128.

FIGS. 9a–9d illustrate different views of the protective cover 28 utilized in conjunction with all embodiments of the telephone line protection modules described above. The protective cover 28 is preferably injection molded using either a glass-filled Celanex 3316 type of plastic, a Valox 420SEO plastic, or other suitable material. The protective cover 28 is molded so as to include a housing 160 to protect the components internal to the telephone line protection module. As noted above, the cover 28 includes a pair of downwardly depending tabs 34 for snap fitting to the base 12 by way of the holes 36 in the cover 160 and the buttons 38 formed on the side edge of the base 12. The protective cover 28 includes a finger grip type of handle 162 that can be easily grasped to either remove or insert the telephone line protection device into a socket (not shown).

In accordance with an important feature of the invention, a number of web structures are formed internal to the housing 160 to provide position stability of various components housed therein. A pair of outer plastic webs 164 and 166 are formed internal to the housing 160 and function to provide lateral positioning stability to the PTC elements 64 and 70. In addition, a central plastic web 168 functions to provide an insulating divider between the PTC elements 64 and 70. The PTC elements 64 and 70 cannot thereby be moved in contact with each other to short circuit the tip and ring circuits. As noted above, the internal surface of the cover 160 itself prevents lateral movement of the conductive copper member 74 with the overvoltage sensitive devices attached thereto. The cover 60 does not directly engage or provide support against spring biased elements. To that end, should heat generated by internal components be transferred to the plastic cover 160, such cover will not become distorted or otherwise splintered or disintegrated to allow hot metal to be ejected external to the module.

Figure 11:
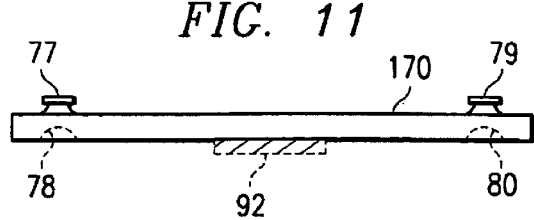
FIG. 11 is a top view of an overvoltage assembly incorporating two overvoltage sensitive devices.

FIG. 11 depicts an overvoltage sensing assembly that utilizes only two semiconductor devices 77 and 79. The third semiconductor device 76 is not utilized in this arrangement. Rather, the heat transfer member 92 is spring biased directly against the front side of the conductive copper member 170. Again, the semiconductor devices 77 and 79 can be fixed to the conductive copper member 170, or to respective conductor tower strips 50 or 52.

As yet other alternatives, those skilled in the art may prefer to construct the spring member 60 so as to be split and provide two heat transfer members 92. Such an arrangement can be utilized with the assembly 170 shown in FIG. 11. Moreover, the conductive member 74 or 170 can be made as two separate members that operate independently with the respective overvoltage sensitive devices 77 and 79. In yet other alternatives, additional spring biasing can be applied to the conductive members 74 and 170. The additional springs may or may not be necessary for carrying electrical currents, but only for applying additional pressure to the conductive members 74 and 170.

From the foregoing, it can be seen that there is disclosed a telephone line protection device that overcomes many of the problems attendant with the current prior art devices. The manner in which the telephone line protection device is structured facilitates assembly and thereby reduces the overall costs to manufacture the product. In addition, with fewer components than currently available modules, the reliability is substantially enhanced. While SIDACtor® devices are utilized in the preferred embodiment, other voltage sensitive devices can be employed, such as triacs, varistors, thyristors, etc.

Although various embodiments of the invention have been illustrated in the accompanying drawings and described in the foregoing detailed description, it will be understood that the principles and concepts of the invention are not limited to the embodiments disclosed, but are capable of numerous other arrangements, modifications and substitution of parts and elements without departing from the spirit and scope of the invention, as defined by the appended claims.

What is claimed is:

1. A communication line protection module providing overvoltage and failsafe protection comprising:
    a tip conductor, a ring conductor and a ground conductor;
    a spring member connected to said ground conductor, said spring member adapted for movement into contact with at least one of said tip or ring conductors for shorting at least one said tip or ring conductor to ground;
    a conductive member biased by said spring member toward said tip or ring conductor; and
    a first and second overvoltage sensitive device, each said overvoltage sensitive device sandwiched between said conductive member and a respective said tip conductor or ring conductor, such that the first and second overvoltage sensitive devices are in electrical contact with said conductive member and a respective said tip conductor or ring conductor.

2. The communication line protection module of claim 1, wherein said spring member is soldered to a heat transfer member which urges said conductive member toward one said tip or ring conductor, and wherein said spring member is released from said heat transfer member after said solder melts to contact one said tip or ring conductor to thereby short circuit said tip or ring conductor to ground.

3. The communication line protection module of claim 1, further including a third overvoltage sensitive device, and a heat transfer member soldered to said spring member, said third overvoltage sensitive device positioned between said heat transfer member and said conductive member.

4. The communication line protection module of claim 1, wherein said conductive member is mounted for movement toward said tip and ring conductors by said spring member when said overvoltage sensitive device is damaged due to thermal energy.

5. The communication line protection module of claim 1, further including three said overvoltage sensitive devices, each bonded with an electrically conductive bonding material to said conductive member.

6. The communication line protection module of claim 1, further including a heat transfer member soldered to said spring member, and wherein said heat transfer member is in thermal contact with said conductive member.

7. The communication line protection module of claim 1, wherein said overvoltage sensitive devices are positioned directly between said conductive member and a respective said tip or ring conductor so that if a portion of either said overvoltage sensitive device melts, said conductive member moves toward an associated said tip or ring conductor.

8. The communication line protection module of claim 1, wherein said tip and ring conductors define telephone line tip and ring conductors, and further including an equipment side tip and ring conductor, and further including a first and second overcurrent protection device, said first overcurrent protection device being connected between said telephone line tip conductor and said equipment side tip conductor, and said second overcurrent protection device being connected between said telephone line ring conductor and said equipment side ring conductor.

9. A communication line protection module providing communication line overvoltage and failsafe protection, comprising:
    a base supporting at least a ground conductor, a tip conductor and a ring conductor;
    a conductive spring member electrically connected to said ground conductor of said module, said spring member adapted for engaging said tip and ring conductors to short circuit said tip and ring conductors together and to ground;
    a heat transfer member bonded to said spring member with a heat sensitive material so as to become unbonded from said spring member in response to thermal energy transferred to the heat sensitive material via said heat transfer member;
    a conductive member to which two or more overvoltage sensitive devices are mounted, said conductive member being biased toward said tip and ring conductors by said spring member via said heat transfer member; and
    said spring member being maintained in a first position such that said spring member is not in electrical contact with said tip and ring conductors when said heat transfer member remains bonded to said spring member, and said spring member is biased to move to a second position when thermal energy generated by said overvoltage sensitive devices causes said heat transfer member to become unbonded from said spring member, thereby allowing a portion of said spring member to move and engage said tip and ring conductors.

10. The communication line protection module of claim 9, wherein three overvoltage sensitive devices are mounted to said conductive member to provide a balanced electrical circuit between said tip, ring and ground conductors.

11. The communication line protection module of claim 10, wherein said conductive member is assembled so as to include one said overvoltage sensitive device on one side thereof, and a pair of other said overvoltage sensitive devices on an opposite side of said conductive member.

12. The communication line protection module of claim 11, wherein each overvoltage sensitive device of said pair of overvoltage sensitive devices engages a conductive tower strip connected to a respective said tip and ring conductor, and said third overvoltage sensitive device engages said heat transfer member.

13. The communication line protection module of claim 9, further including a protective cover removably fastened to said base, and opposing inside surfaces of said protective cover restrict axial movement of said conductive member.

14. The communication line protection module of claim 9, wherein each overvoltage sensitive device is soldered only to said conductive member.

15. The communication line protection module of claim 9, wherein said conductive member and said overvoltage sensitive devices attached thereto define an assembly that is insertable between said spring member and said tip and ring conductors.

16. The communication line protection module of claim 9, further including three said overvoltage sensitive devices, and wherein two said overvoltage sensitive devices have substantially identical electrical characteristics, and a third said overvoltage sensitive device has different electrical characteristics than said two overvoltage sensitive devices.

17. The communication line protection module of claim 9, further including three said overvoltage sensitive devices, each electrically fixed to said conductive member.

18. The communication line protection module of claim 9, further including a first and second elongate conductor strip connected directly to respective module pins associated with customer equipment, and a third and fourth elongate conductor strip connected directly to respective module pins associated with a communication line, and further including a first current limiting device sandwiched between said first and third conductor strips, and a second current limiting device sandwiched between the second and fourth conductor strips.

19. The communication line protection module of claim 9, further including a housing adapted for attaching to said base, and wherein said housing has formed on an inner surface thereof webs for maintaining registration of components mounted to said base.

20. The communication line protection module of claim 18, further including a half ringer circuit connected between said third and fourth conductor strips.

21. The communication line protection module of claim 9, further including first and second elongate conductor strips associated with customer equipment, and third and fourth elongate conductor strips associated with a communication line, and further including a mechanism held in compression between said first and third conductor strips and between said second and fourth conductor strips, said mechanism being wired so as to provide a reversal of said communication line.

22. A communication line protection module, comprising:
a plurality of pins, a first and second of which are associated with customer equipment circuits, hand a third and fourth pin which are associated with communication line circuits, and further including a fifth pin associated with ground;
a base for supporting said pins in a predefined configuration;
a first and second elongate conductor strip, each fixed to a respective first and second pin associated with the customer equipment;
a third and fourth elongate conductor strip, each fixed to a respective third and fourth pin associated with the communication line circuits;
a conductive member to which three overvoltage sensitive semiconductor devices are mounted, a first and second said semiconductor devices being engageable respectively with said third and fourth elongate conductor strips;
a conductive spring member connected to said fifth pin, said conductive spring member having a pair of arms adapted for short circuiting together said third an d fourth elongate conductor strips when said conductive spring member moves toward a relaxed position; and
a heat conductive member soldered to said conductive spring member in a position such that said heat conductive member is spring biased against said third semiconductor device, whereby when said third semiconductor device generates sufficient thermal energy to melt the solder, a portion of said conductive spring m ember arms move and cause short circuiting of said third and fourth elongate conductor strips.

23. The communication line protection module of claim 22, further including a housing having internal webs for providing registration stops for components attached to said base.

24. The communication line protection module of claim 22, wherein said third and fourth elongate conductor strips have at ends thereof a respective test point accessible via holes in a housing snap fit to said base.

* * * * *